United States Patent
Muegge

(10) Patent No.: US 11,274,805 B2
(45) Date of Patent: Mar. 15, 2022

(54) LIGHTING APPARATUS FOR VEHICLES

(71) Applicant: HELLA GmbH & Co. KGaA, Lippstadt (DE)

(72) Inventor: Martin Muegge, Geseke (DE)

(73) Assignee: Hella GmbH & Co. KGaA, Lippstadt (DE)

( * ) Notice: Subject to any disclaimer, the term of this patent is extended or adjusted under 35 U.S.C. 154(b) by 0 days.

(21) Appl. No.: 17/231,857

(22) Filed: Apr. 15, 2021

(65) Prior Publication Data
US 2021/0231287 A1 Jul. 29, 2021

Related U.S. Application Data

(63) Continuation of application No. PCT/EP2019/077143, filed on Oct. 8, 2019.

(30) Foreign Application Priority Data

Oct. 15, 2018 (DE) .................. 10 2018 125 433.4

(51) Int. Cl.
| | | |
|---|---|---|
| *F21S 43/239* | (2018.01) | |
| *F21S 43/249* | (2018.01) | |
| *F21S 43/14* | (2018.01) | |
| *F21S 43/245* | (2018.01) | |
| *F21V 8/00* | (2006.01) | |
| *F21W 105/00* | (2018.01) | |

(52) U.S. Cl.
CPC ............ *F21S 43/239* (2018.01); *F21S 43/14* (2018.01); *F21S 43/245* (2018.01); *F21S 43/249* (2018.01); *G02B 6/0028* (2013.01); *G02B 6/0041* (2013.01); *F21W 2105/00* (2018.01)

(58) Field of Classification Search
CPC combination set(s) only.
See application file for complete search history.

(56) References Cited

U.S. PATENT DOCUMENTS

| | | | |
|---|---|---|---|
| 9,242,594 B2 * | 1/2016 | Nakada | ............... F21S 43/249 |
| 10,338,297 B2 | 7/2019 | Jang et al. | |
| 10,352,524 B1 * | 7/2019 | Hong | ................... F21V 13/04 |
| 11,022,742 B2 * | 6/2021 | Ohtawa | ............... G02B 6/0038 |

(Continued)

FOREIGN PATENT DOCUMENTS

| | | |
|---|---|---|
| DE | 102005018212 A1 | 10/2006 |
| DE | 102009058458 A1 | 7/2011 |

(Continued)

OTHER PUBLICATIONS

International Search Report dated Dec. 20, 2019 in corresponding application PCT/EP2019/077143.

*Primary Examiner* — Jong-Suk (James) Lee
*Assistant Examiner* — Eric T Eide
(74) *Attorney, Agent, or Firm* — Muncy, Geissler, Olds & Lowe, P.C.

(57) ABSTRACT

A lighting device for vehicles, including a light source and including a two-dimensional luminous element, which has a light-coupling narrow side, a light-decoupling flat side and a deflector for deflecting the light coupled in at the light-coupling narrow side in the direction of the light-decoupling flat side, the two-dimensional luminous element including segmenter, with the aid of which the light-decoupling flat side is divided into luminous segments having different emission characteristics.

4 Claims, 4 Drawing Sheets

(56) References Cited

U.S. PATENT DOCUMENTS

| | | | |
|---|---|---|---|
| 2015/0330593 A1 | 11/2015 | Larsen et al. | |
| 2016/0069525 A1* | 3/2016 | Chen | F21S 41/148 |
| | | | 362/612 |
| 2016/0369967 A1* | 12/2016 | Nakada | F21S 41/29 |
| 2017/0234501 A1* | 8/2017 | Hanami | G02B 6/0036 |
| | | | 362/511 |
| 2019/0078747 A1* | 3/2019 | Wu | G02B 27/0905 |
| 2019/0154228 A1* | 5/2019 | Xiang | F21S 41/192 |
| 2019/0285242 A1* | 9/2019 | Horikawa | F21S 43/14 |

FOREIGN PATENT DOCUMENTS

| | | |
|---|---|---|
| DE | 102014110225 A1 | 1/2016 |
| DE | 102017101593 A1 | 8/2018 |
| EP | 2354637 A2 | 8/2011 |
| EP | 2871405 A2 | 5/2015 |
| FR | 2939868 A1 | 6/2010 |
| JP | 2009206064 A | 9/2009 |
| JP | 2015138670 A | 7/2015 |
| JP | 2016178059 A | 10/2016 |
| WO | WO2014105470 A1 | 7/2014 |

\* cited by examiner

LIGHTING APPARATUS FOR VEHICLES

This nonprovisional application is a continuation of International Application No. PCT/EP2019/077143, which was filed on Oct. 8, 2019 and which claims priority to German Patent Application No. 10 2018 125 433.4, which was filed in Germany on Oct. 15, 2018 and which are both herein incorporated by reference.

BACKGROUND OF THE INVENTION

Field of the Invention

The present invention relates to a lighting device for vehicles, including a light source and including a two-dimensional luminous element, which has a light-coupling narrow side, a light-decoupling flat side and a deflector for deflecting the light coupled in at the light-coupling narrow side in the direction of the light-decoupling flat side.

Description of the Background Art

A lighting device for vehicles is known from DE 10 2017 101 593 A1, in which a two-dimensional luminous element is assigned to a light source. The two-dimensional luminous element includes multiple luminous sections having different emission characteristics, which are effectuated by integrated dispersing elements of different designs. The know lighting device requires a relatively large installation space, since the light is coupled in through the spaced-apart light source on a flat side of the two-dimensional luminous element.

A lighting device for vehicles is known from EP 2 354 637 A2, which includes a light source and a two-dimensional luminous element, in which the light is coupled into the two-dimensional lighting element via a light-coupling narrow side thereof. The two-dimensional luminous element includes deflectors, so that the coupled light is deflected in the direction of a light-decoupling flat side. The disadvantage of the known lighting device is that an additional two-dimensional luminous element must be molded on to provide an additional emission characteristic or additional light function, which increases the manufacturing costs.

SUMMARY OF THE INVENTION

It is therefore an object of the present invention to provide a lighting device for vehicles, which includes a two-dimensional luminous element, in such a way that light having different emission characteristics may be emitted in a space-saving and cost-effective manner.

To achieve this object, the invention is characterized in that the two-dimensional luminous element includes segmenters, with the aid of which the light-decoupling flat side is divided into luminous segments having different emission characteristics.

According to the invention, the two-dimensional luminous element itself includes segmenters, with the aid of which a light-emitting flat side of the two-dimensional luminous element may be divided into luminous sections having different emission characteristics. At least two luminous sections have different dispersing optical elements, so that light having different emission characteristics is emitted. The luminous sections each represent luminous surfaces, which have a different appearance. To an observer, the luminous sections appear as planar light sources (light emitters) of different sizes and/or having different contours and/or different luminosities and/or different directions of illumination. The luminous sections permit a homogeneous light emission over a wide area, since uniformly shaped dispersing optical elements are assigned to each of the luminous sections.

The segmenters is designed as a step between a first luminous section and a second luminous section. If a deflector is arranged on a rear side of the two-dimensional luminous element, the step runs on the rear side of the two-dimensional luminous element. The deflecting effect induced thereby is not detectable from the front side, so that a homogeneous light emission from different luminous sections is ensured.

The segmentor is designed as a separating web, which extends in a raised or recessed manner from a surface of the two-dimensional luminous element arranged on the rear side. The separating web acts as an optical partition line, since it already effectuates a refraction of the light, due to its shaping, so that a viewer perceives an optical separation hereby between adjacent luminous sections of the two-dimensional luminous element. The separating web itself is not perceived by the observer, since a front side of the two-dimensional luminous element is designed to be smooth or free of the separating web.

The separating web is arranged in a raised manner on a rear side of a front component of the two-dimensional luminous element and/or on a front side of a rear component of the two-dimensional luminous element. The separating web is covered by a rear component made from a diffused reflecting material, so that it is not detectable from either a front side or a rear side of the two-dimensional luminous element. Both the front side and the rear side of the two-dimensional luminous element may be provided with a smooth design. Due to the fact that the rear component is made from a diffusely luminous material or a material doped with nanoparticles, a homogeneous light emission of the luminous element over a wide area is achieved. An optional sputtering, mirroring, painting or printing of the rear side (rear flat side) of the luminous element prevents a rear-side light emergence and increases the efficiency due to a stronger front-side illumination.

According to a refinement of the invention, a light supplying element designed in the manner of a light guide abuts a light-coupling narrow side of the two-dimensional luminous element. The light supplying element is connected to form a single piece only with the front component of the two-dimensional luminous element, so that the entire luminous flux is coupled only into the front component. The rear component is used to receive the coupled light and to further homogenize the illumination in the particular luminous sections. Adjacent light guiding sections are separated from each other by separating slits, the separating slits each running on the separating webs of the luminous element. In this way, the light sources may be arranged independently of the location of the two-dimensional luminous element, the light assigned for the particular luminous sections being able to be coupled into the two-dimensional luminous element independently of each other via the corresponding light guiding elements. By selecting the light sources with respect to color and luminosity, the emission characteristic of the different luminous sections may thus be influenced.

According to one refinement of the invention, the light guiding elements run toward the light-coupling narrow side at an acute angle in a molded-on section. The molded-on section includes deflecting optics for deflecting the light guided in the light guiding elements in the direction of the light-coupling narrow side. A multichannel guiding of light on narrow sides of the two-dimensional luminous element may be advantageously provided hereby in a space-saving manner.

Further scope of applicability of the present invention will become apparent from the detailed description given hereinafter. However, it should be understood that the detailed description and specific examples, while indicating preferred embodiments of the invention, are given by way of illustration only, since various changes, combinations, and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus, are not limitive of the present invention, and wherein.

DETAILED DESCRIPTION

Figure 1:
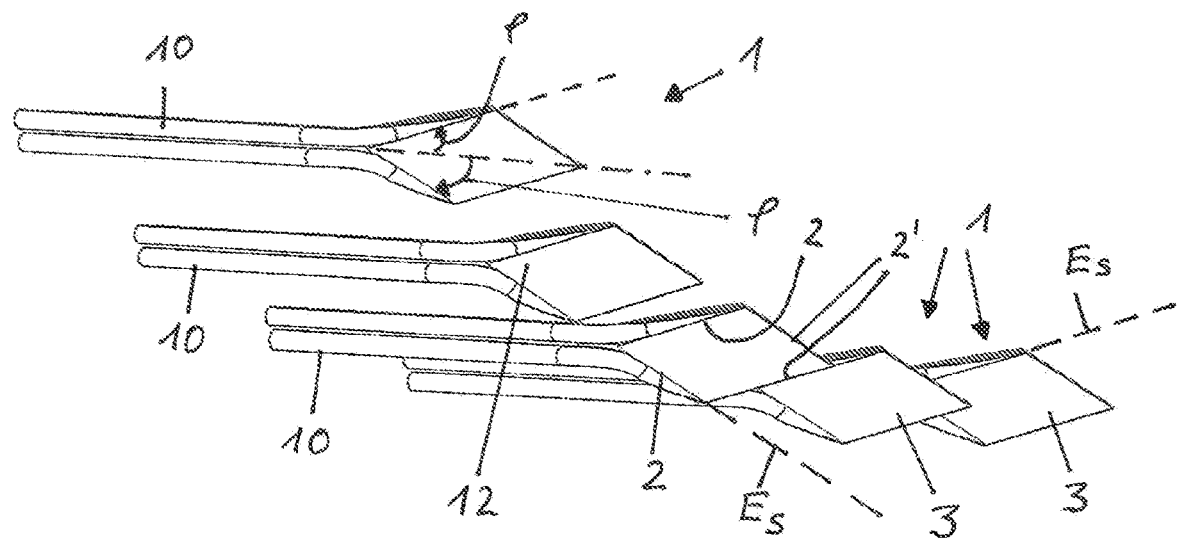
FIG. 1 shows a perspective representation of multiple two-dimensional luminous elements and two light guiding elements assigned thereto in each case according to a first specific embodiment of a lighting device.
Figure 2:
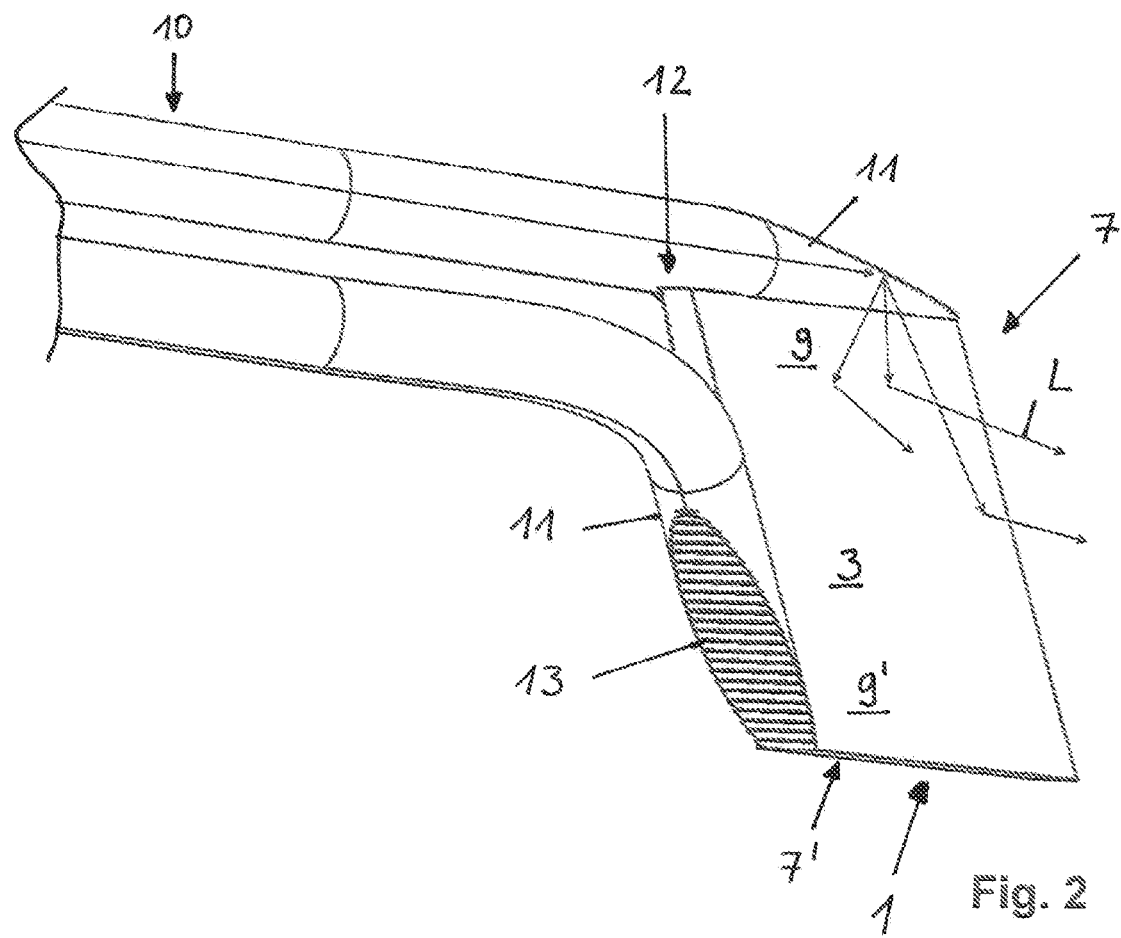
FIG. 2 shows an enlarged representation of the two-dimensional luminous element according to FIG. 1, viewed from a front side.

A lighting device for vehicles is preferably used as a signal lamp for generating a tail light, brake light, turn-signal and/or daytime running light function.

According to a first specific embodiment of the invention according to FIGS. 1 through 4, a lighting device includes a number of two-dimensional luminous elements 1, which are arranged in a cup-shaped housing of the lighting device, which is not illustrated and is closed by a cover panel. Two-dimensional luminous elements 1 each have a number of light-coupling narrow sides 2 as well as oppositely situated flat sides 3, 4. A front flat side 3 is designed as a light-decoupling flat side, at which light L is decoupled. A rear flat side 4 forms a rear-side surface, on which deflectors 5 are provided for deflecting light L coupled in at light-coupling narrow side 2.

Figure 3:
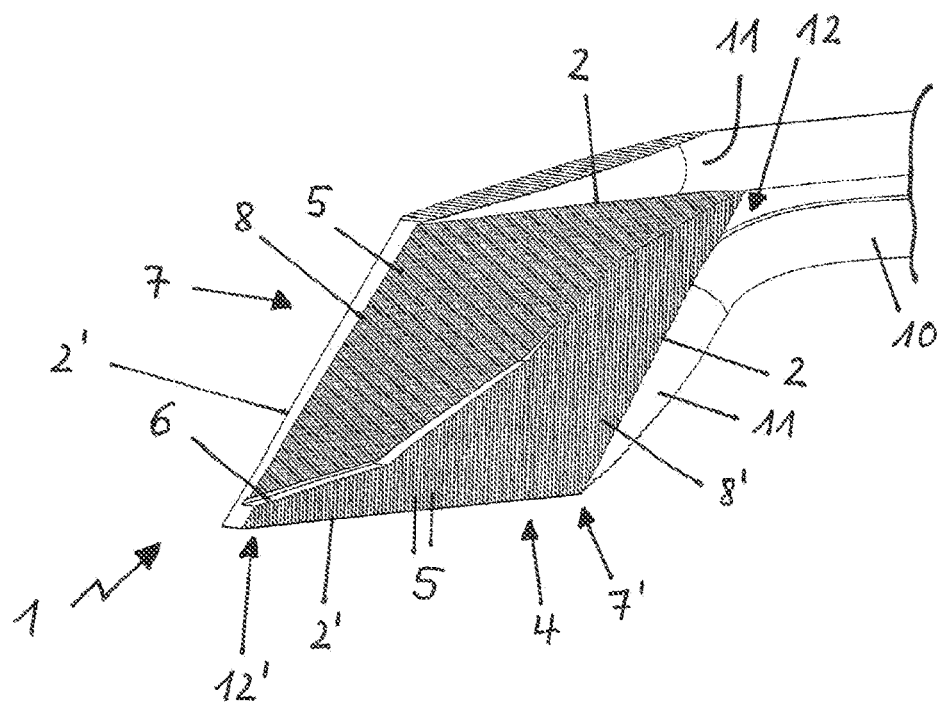
FIG. 3 shows a rear view of the two-dimensional luminous element according to the specific embodiment according to FIG. 1.

As is apparent, in particular, from FIG. 3, a number of first deflectors 5 and a number of second deflectors 5', separated via segmenter 6, which differ in terms of their formation or design, are arranged on rear flat side 4 of two-dimensional luminous element 1. Segmenter 6 is designed as a step, which, in a projection onto front flat side 3 of two-dimensional luminous element 1, divides the latter into a first luminous section 7 and a second luminous section 7'. Light L deflected at first deflectors 5 is deflected in the direction of a first segment of front flat side 3, and the light deflected by second deflectors 5' is deflected into a second segment of front flat side 3, so that light having different emission characteristics may be emitted by first luminous section 7 and second luminous section 7'. First luminous section 7 is limited on the rear side by a first segment 8 of rear flat side 4 and a first segment 9 of front flat side 3. Second luminous section 7' is limited by a second segment 8' of rear flat side 4 and a second segment 9' of front flat side 3. A surface of flat sides 3, 4 is multiple times larger than a surface of light-coupling narrow sides 2 or non-light-coupling narrow sides 2'. First luminous section 7 and second luminous section 7' are thus essentially arranged side by side, whereby they undergo a separation with the aid of step 6. Although front flat side 3 having the two segments 9, 9' is provided with a smooth and differentially continuous design, rear step 6 would result in a different light emission characteristic, even if first luminous section 7 and second luminous section 7' were otherwise to have the same design.

According to an alternative specific embodiment of the invention, which is not illustrated, segmenter 6 may also be designed as a narrow lens-free strip on rear flat side 4.

Front flat side 3 does not have a segmenter 6.

Two-dimensional luminous element 1 is provided with a plate-shaped and rectangular design. A light guiding element 10 is molded over a molded-on section 11 on two light-coupling narrow sides 2 arranged at an angle to each other. Molded-on section 11 of light guiding elements 10 runs on light-coupling narrow side 2 at an acute angle φ to an extension direction $E_S$ thereof. In the present exemplary embodiment, two light guiding elements 10 are supplied in parallel to two-dimensional luminous element 1, the molded-on sections 11 of the two light guiding elements 10 being spread apart in a corner area 12 of two-dimensional luminous element 1. A light-decoupling surface of light guiding elements 10 essentially extends over the entire surface of light-coupling narrow side 2.

Molded-on section 11 has this deflecting optics 13 on a side thereof facing away from light-coupling narrow side 2, with the aid of which the light guided in light guiding element 10 is deflected in the direction of light-coupling narrow side 2 of two-dimensional luminous element 1. Deflecting optics 13 may be designed, for example, as prism elements.

As is apparent from FIG. 3, step 6 runs in the direction of corner area 12 of two-dimensional luminous element 1, at which the two light-coupling narrow sides 2 of two-dimensional luminous element 1 converge. Step 6 preferably runs continuously between corner area 12 and a further corner area 12', a diagonal division of two-dimensional luminous element 1 into first luminous section 7 and second luminous section 7' taking place.

Figure 4:
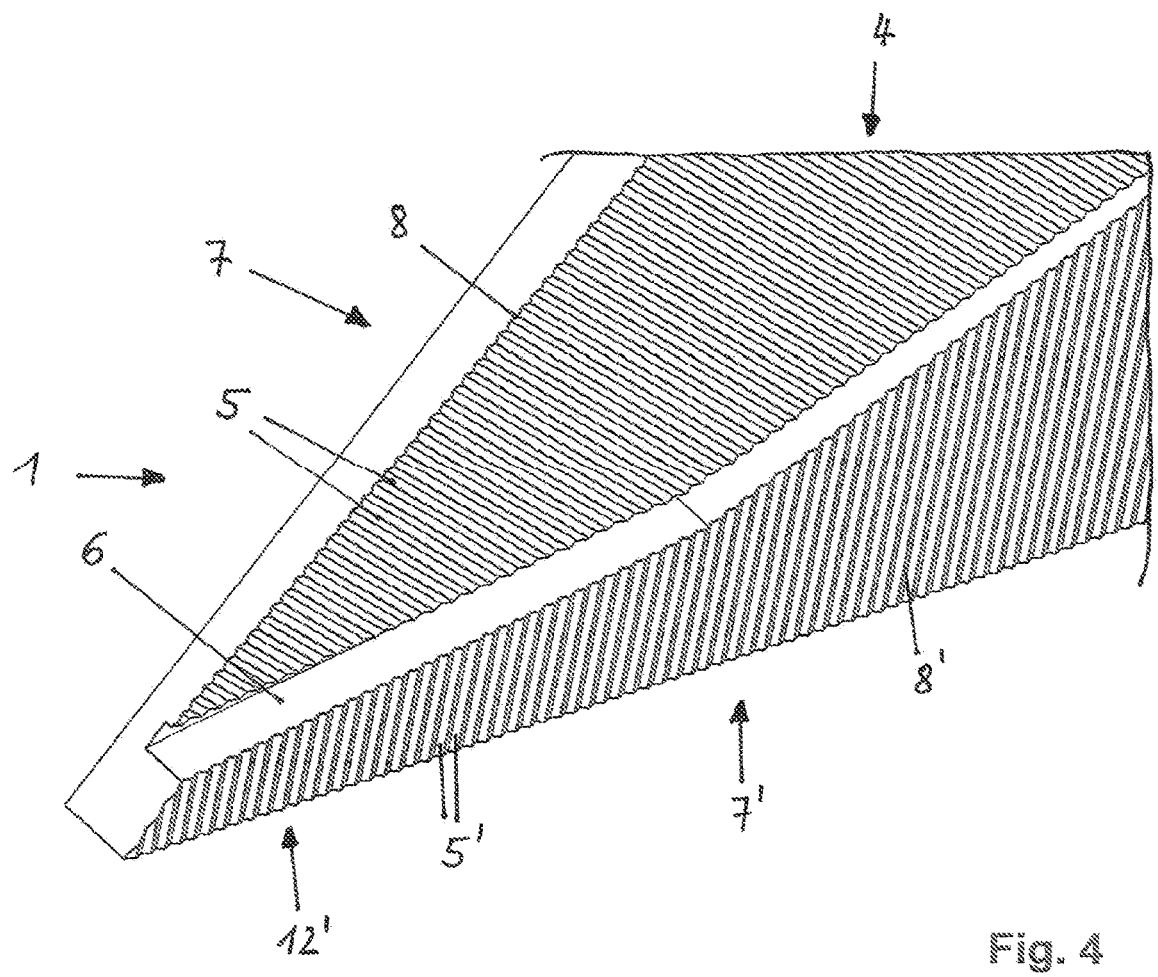
FIG. 4 shows an enlarged representation of one part of the rear side of the two-dimensional luminous element according to FIG. 3.
Figure 5:
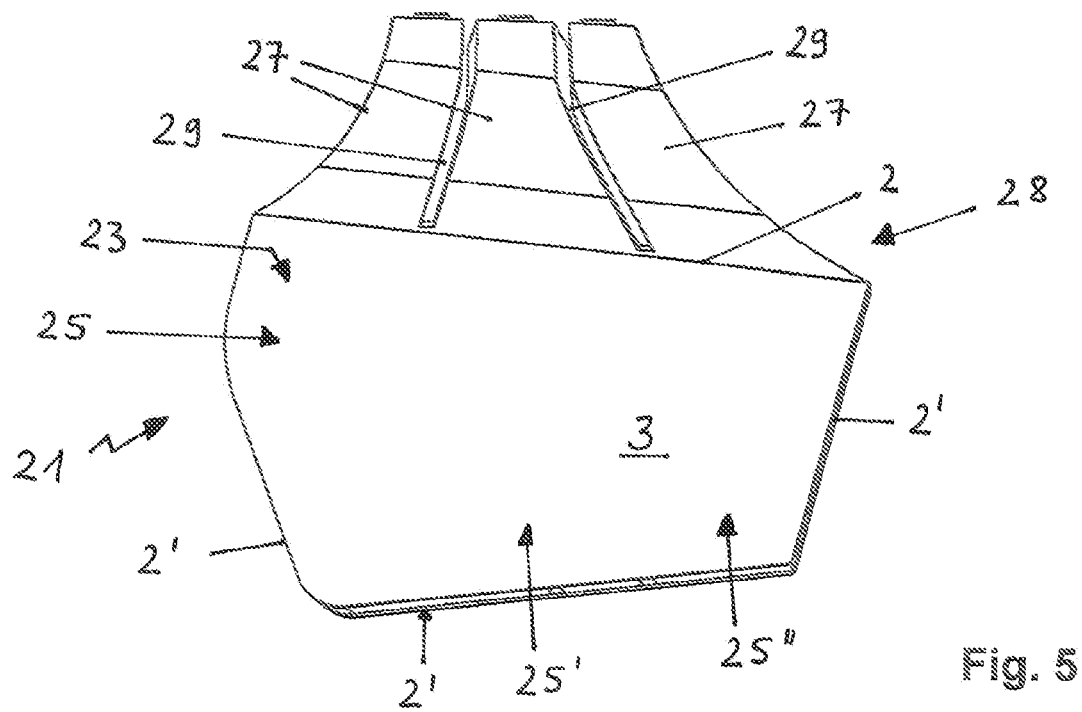
FIG. 5 shows a front view of the lighting device, including multiple light guiding elements molded onto a narrow side thereof according to a second specific embodiment.

First deflectors 5 and second deflectors 5' may be formed, for example, by prism-shaped dispersing optical elements 5, 5', which run with different orientations to each other (cf. FIG. 4).

According to an alternative specific embodiment of the invention, which is not illustrated, deflectors 5, 5' may also be formed by diffractive optical elements in the μm or nm range, which are arranged within two-dimensional luminous element 1. In this case, rear flat side 4 of two-dimensional luminous element 1 may also be provided with a smooth or differentially continuous design.

A light source, for example an LED light source or a laser light source, which couples light L into light guiding element 10, may be arranged on a light-coupling surface of light guiding element 10, which is not illustrated. Light guiding element 10 is preferably designed as a light guide. If necessary, the light-coupling surface of light guiding element 10 may be provided as a structured surface or with a coupling lens. The coupling lens may be formed, for example, by a plurality of prism elements.

Two-dimensional luminous element 1 and light guiding element 10 are both essentially made from a transparent plastic or glass material.

Alternatively, rear flat side 4 of two-dimensional luminous element 1 is provided with a sputtering, mirroring, painting or printing to emit coupled light only in the direction of light-decoupling flat side 3.

According to a further specific embodiment of the invention according to FIGS. 5 through 8, a lighting device is provided, which includes a two-dimensional luminous element 21, which has only a single light-coupling narrow side 2. Three other narrow sides 2' are designed as non-light-coupling narrow sides.

Identical components or component functions of the exemplary embodiments are provided with the same reference numerals.

Two-dimensional luminous element 21 includes a rear component 22, which is made from a diffusely luminous material or a material doped with nanoparticles, and a front component 23, made from a transparent material. Nanoparticles are dispersing elements which are dimensioned in a nm range. Front component 23 has light-decoupling flat side 3. Rear component 22 may be made from an opaque material, for example.

As segmenter. a separating web 26, with the aid of which two-dimensional luminous element 21 is divided into three different luminous sections 25, 25', 25", is raised from a front side 24 of rear component 22 facing front component 23.

Alternatively, the separating web may also be recessed with respect to a rear flat side of luminous element 1 or 21. For example, the separating web may run as a recess (groove) in rear flat side 4 of luminous element 1. For example, the separating web may run as a recess (groove) in the rear side of front component 23 of luminous element 21.

Figure 7:
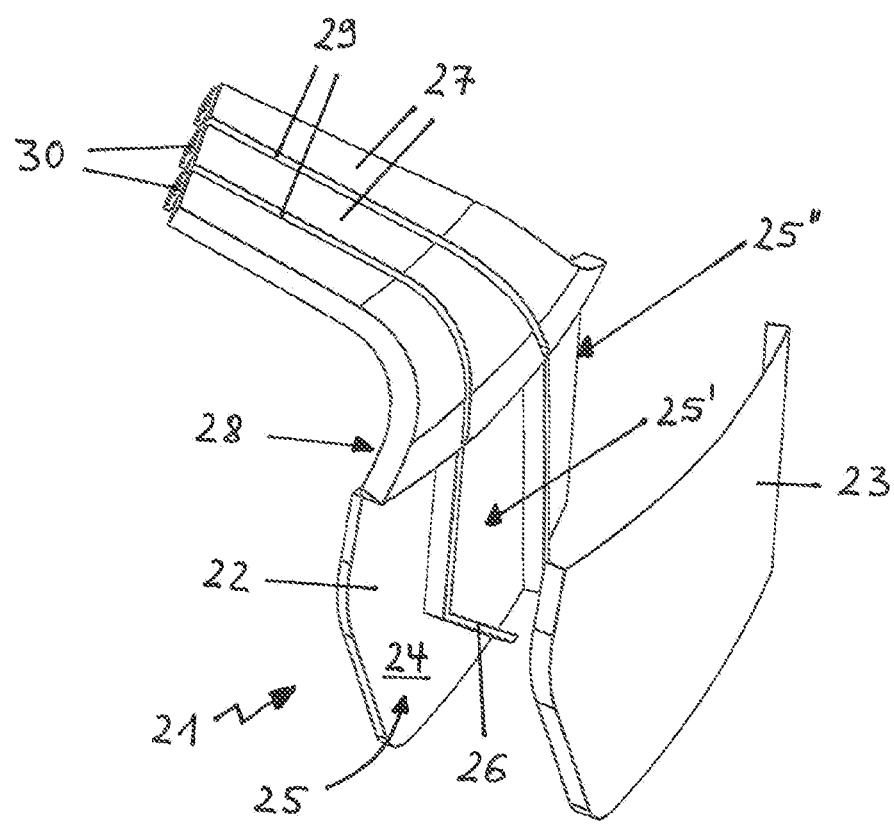
FIG. 7 shows an exploded view of the lighting device according to FIG. 6.
Figure 8:
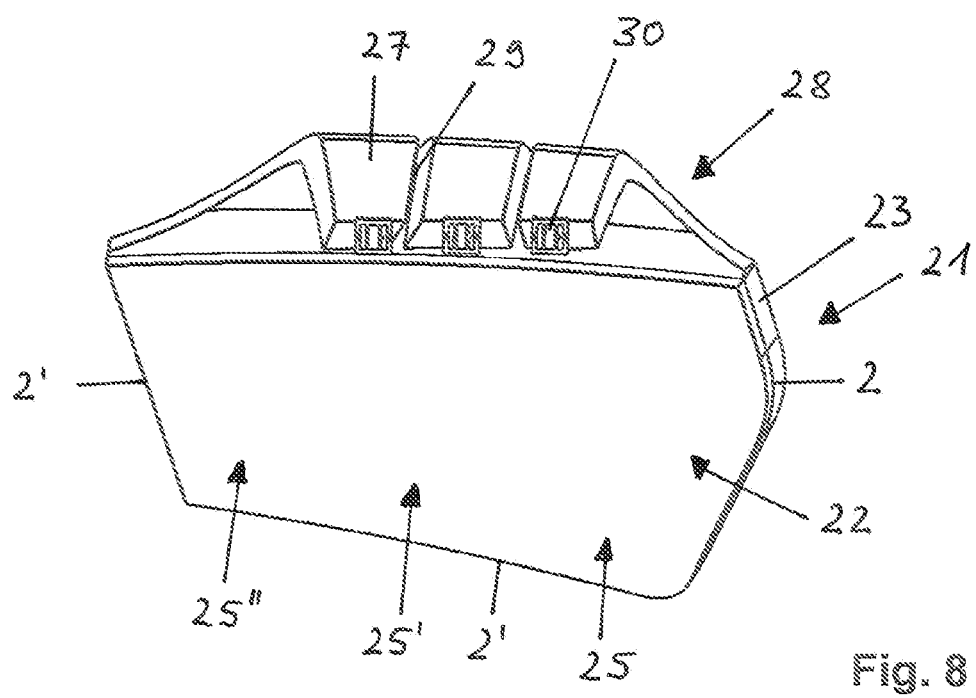
FIG. 8 shows a rear view of the lighting device according to the second specific embodiment.

As is apparent from FIG. 7, separating web 26 is provided with a rectangular design in cross section and is connected to rear component 22 only via a single edge side. The further edge sides of separating web 26 extend within front component 23.

Separating web 26 has the same material as rear component 22. Separating web 26 effectuates an optical separation between luminous sections 25, 25', 25" of two-dimensional luminous element 21, so that light having different emission characteristics is decoupled or emitted, depending on the light sources and/or on the deflectors integrated within front component 23.

Alternatively, separating web 26 may be made from the same material as front component 23 or from a third opaque material, which differs from the material of front component 23 and rear component 22.

Figure 6:
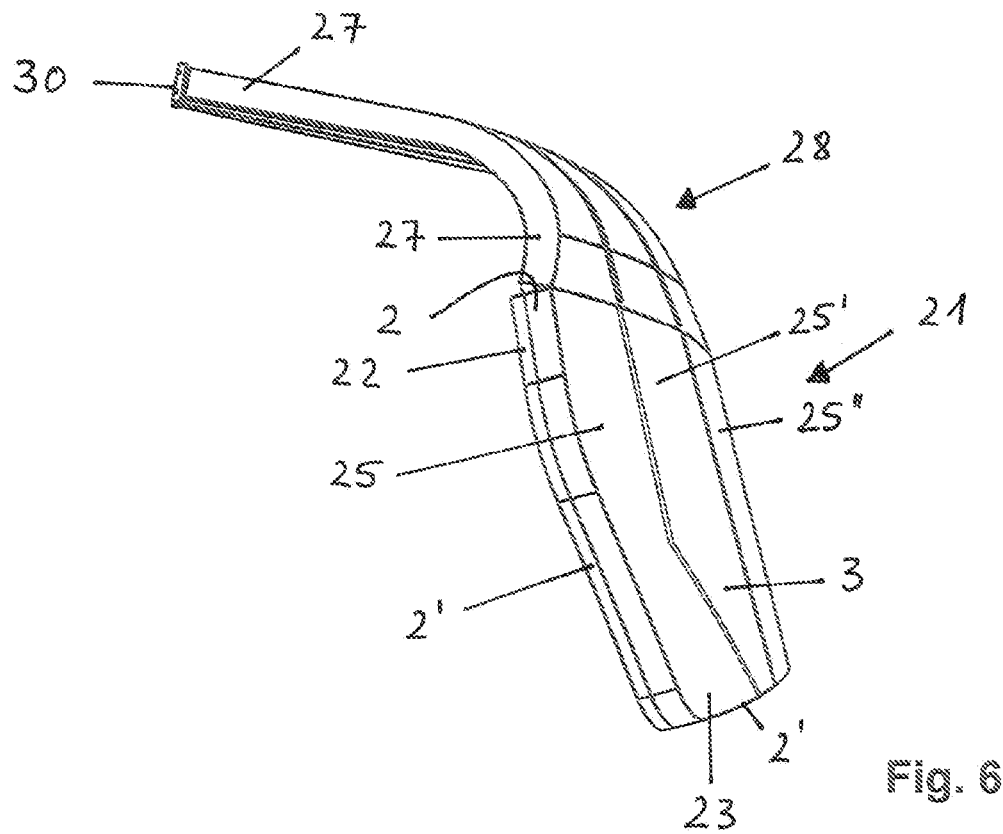
FIG. 6 shows a side view of the lighting device according to the second specific embodiment of the lighting device.

As is apparent from FIG. 6, light guiding elements 27 are connected only to front component 23 as a single piece on light-coupling narrow side 2 of two-dimensional luminous element 21. Light guiding elements 27 are provided with a rectangular design in cross section and widen in a molded-on section 28, so that the light-decoupling surface of light guiding elements 27 matches light-coupling narrow side 2 of front component 23. Light guiding elements 27 are separated from each other only via separating slits 29, so that light guiding elements 27 may run in light sources 30 arranged in a common plane. Due to separating slit 29, adjacent light guiding elements 27 are arranged at a distance from each other. Separating slits 29 extend from the light-coupling surface of light guiding elements 27 up to the vicinity of the light-decoupling surface of light guiding elements 27 or the vicinity of light-coupling narrow side 2 of two-dimensional luminous element 21. If light sources 30 emit lit of different light colors, different light functions may be generated via the same two-dimensional luminous element 21, for example a turn-signal light function (yellow light) and a tail light function (red light). The variation with respect to the different light emission characteristics of different luminous sections 25, 25', 25" is also determined by the dispersing optical elements of different designs within front component 23.

According to an alternative specific embodiment of the invention, rear component 22 may also be made from a light gray, gray, black or red material or a material of another color instead of from a white, milky material.

According to an alternative specific embodiment of the invention, which is not illustrated, rear component 22 may also project over front component 23 in the extension direction of two-dimensional luminous element 21, so that a frame of two-dimensional luminous element 21 is formed.

According to a further specific embodiment of the invention, which is not illustrated, rear component 22 may also be manufactured by a two-dimensional painting or by a printing or by a sputtering or by a mirroring. In this case, a two-component manufacturing of two-dimensional luminous element 21 is not necessary. In this design, front component 23 has recessed separating grooves on a rear side thereof as segmenter.

The illustrated exemplary embodiments represent preferred specific embodiments of the present invention. It should be noted that the illustrated features may be implemented not only in the feature combinations of the exemplary embodiments described, but also by combinations of features of the different exemplary embodiments.

The invention being thus described, it will be obvious that the same may be varied in many ways. Such variations are not to be regarded as a departure from the spirit and scope of the invention, and all such modifications as would be obvious to one skilled in the art are to be included within the scope of the following claims.

What is claimed is:
1. A lighting device for vehicles, comprising:
   a light source; and
   a luminous element, which has a light-coupling narrow side, a light-decoupling flat side and a deflector to deflect light coupled in at the light-coupling narrow side in a direction of the light-decoupling flat side,
   wherein the luminous element includes a segmenter via which the light-decoupling flat side is divided into luminous segments having different emission characteristics,
   wherein the segmenter is a step arranged on a rear flat side of the luminous element, the step running continuously along the rear flat side so as to divide the rear flat side into a first luminous section that is provided to one side of the step and a second luminous section that is provided to another side of the step, and wherein due to the step between the first luminous section and the second luminous section, the first luminous section is provided at a different height level than the second luminous section, and wherein the deflector is provided on each of the first luminous section and the second luminous section, wherein a light guiding element abuts the light-coupling narrow side, the light guiding element including a molded-on section, which extends from a straight section of the light guiding element leading from the light source to the light-coupling narrow side and forming an acute angle with respect to an extension direction thereof, and which includes deflecting optics for deflecting the light guided in the light guiding element in the direction of the light-coupling narrow side, wherein the luminous element has two light-coupling narrow sides to each of which at least one of the light guiding element is assigned, and the step runs in the direction of a corner area of the luminous element, at which the two light-coupling narrow sides converge.

2. The lighting device for vehicles according to claim 1, wherein the rear flat side of the luminous element is provided with a sputtering, mirroring, painting or printing that forms the deflector to deflect the light coupled in at the light-coupling narrow side only in the direction of the light-decoupling flat side.

3. The lighting device for vehicles according to claim 1, wherein a light source is assigned to each one of the light guiding element.

4. The lighting device for vehicles according to claim 1, wherein the deflector comprises prism optics, wherein the prism optics of the first luminous section are arranged differently from the prism optics of the second luminous section.

* * * * *